United States Patent [19]

Aho et al.

[11] Patent Number: 4,799,131

[45] Date of Patent: Jan. 17, 1989

[54] AUTOMOTIVE LIGHTING ELEMENT

[75] Inventors: Kenneth A. Aho, Chisago City; Jeffrey J. Melby, St. Paul; Richard A. Miller, Stillwater, all of Minn.

[73] Assignee: Minnesota Mining and Manufacturing Company, St. Paul, Minn.

[21] Appl. No.: 121,947

[22] Filed: Nov. 18, 1987

[51] Int. Cl.[4] .................. B60Q 1/04

[52] U.S. Cl. .................. 362/61; 362/80; 362/310; 362/348

[58] Field of Search .................. 362/61, 297, 310, 346, 362/348, 80

[56] References Cited

U.S. PATENT DOCUMENTS

| | | | |
|---|---|---|---|
| 1,641,714 | 9/1927 | Whalen | 362/348 X |
| 1,922,787 | 8/1933 | Touchman | 362/61 X |

*Primary Examiner*—Stephen F. Husar

*Attorney, Agent, or Firm*—Donald M. Sell; Stephen W. Buckingham

[57] ABSTRACT

An automotive lighting element has a lower surface with a plurality of ridges and grooves. Those ridges and grooves are reflectorized so that light emitted by a light source in the lighting element will be reflected back into other portions of the reflector rather than out of the lighting element with a large upward vertical component.

10 Claims, 1 Drawing Sheet

AUTOMOTIVE LIGHTING ELEMENT

FIELD OF THE INVENTION

The present invention relates to automotive lighting elements having enhanced safety.

BACKGROUND OF THE INVENTION

Typically a reflector for an automotive lighting element will have a curved shape which may, for example, be parabolic, ellipsoidal or homofocal, in order to provide a reasonably collimated or directed beam of light from the light emitted by the light bulb. Sometimes, for reasons of styling, portions of the reflector will be essentially flat rather than curved. When the bottom portion of the reflector is flat a dangerous situation is created. The danger results from the fact that light reflected off of the flat bottom of the reflector will not be collimated but will be reflected upward. If the lighting element in question is a rear-mounted lamp such as a taillamp or a center high-mounted stop lamp, some of the light will be reflected into the eyes of following drivers. If the lighting element in question is a front-mounted lamp such as a headlamp, some of the light will be reflected into the eyes of on-coming drivers. The danger of this situation is increased in headlamps which are aerodynamically designed with a sloping front. This increased danger arises from the fact that some of the light that would otherwise be intercepted by the upper reflector if the front lens was vertical is allowed to escape from the lamp.

One approach to solving this safety problem is to provide a non-reflecting surface to the lower portion of the reflector. There are two disadvantages inherent in this approach. The first disadvantage is that the efficiency of the lighting element is reduced because the light striking the non-reflecting surface will be absorbed rather than reflected. Second, the darkened surface in the headlight provides an appearance that is less desirable than the highly reflective surface normally present.

Another approach is the use of a bulb shield which prevents light from striking the flat surface. Such shields provide an undesirable appearance when the light source is turned off and creates a shadow in the light beam when the light source is turned on.

SUMMARY OF THE INVENTION

In the present invention a flat lower surface in a headlight reflector is provided with a plurality of ridges and grooves. Those ridges and grooves are reflectorized so that light emitted by the light source will be reflected back into other portions of the reflector rather than out of the lighting element in a direction causing a dangerous situation. The light thus reflected back into the curved portion of the reflector is reflected out of the lighting element in a direction that is generally the same as that of the main beam of the lighting element.

DETAILED DESCRIPTION

The invention will be described in relation to an automotive headlamp. Those skilled in the art will readily perceive that it may also be used in other automotive lighting elements where vertical components in the emerging beam are to be avoided.

Figure 1:
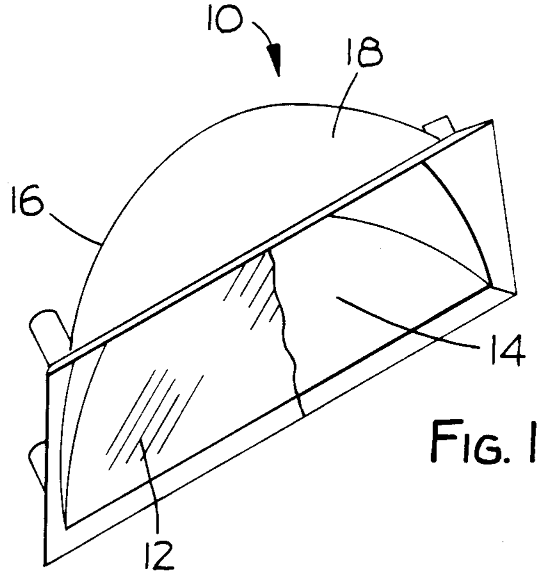
FIG. 1 is a drawing of an automotive headlamp in which the invention is useful.

FIG. 1 is an elevation view of an aerodynamically designed automotive headlamp. The headlamp of FIG. 1 includes a reflector housing 10, typically of a plastic material, and a transparent window 12, typically of either glass or clear plastic. Reflector housing 10 and window 12 define an optical cavity 14. The sides of optical cavity 14, which form the interior walls of reflector housing 10, are highly reflective in order to direct light from bulb 22 out of optical cavity 14 through optical window 12. The high reflectivity may be provided by vapor coating a metal such as aluminum on the inner surface of reflector housing 10 or by other known means for reflectorizing a surface.

Reflector housing 10 has a flat top wall 18 and flat bottom wall 20 joined by a curved wall 16 forming the back and sides of optical cavity 14. Typically a headlamp, such as the headlamp of FIG. 1, will be mounted in an automobile in a manner such that, when the automobile is on a level surface, flat regions 18 and 20 will be horizontal. Under these circumstances, optical window 12 will make an acute angle with the vertical.

Figure 2:
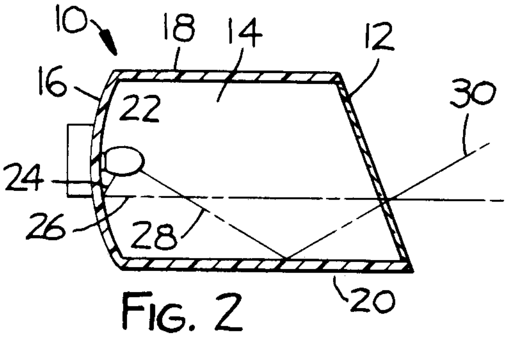
FIG. 2 PRIOR ART
FIG. 2 is a cross-sectional side view of an automotive headlamp of the prior art.

The operation of a headlamp of the type shown in FIG. 1 constructed in accordance with the prior art may be more clearly seen by reference to FIG. 2. A ray of light 24 emitted by light bulb 22 strikes curved region 16 of reflector housing 10 and becomes reflected light ray 26. Reflected light ray 26 emerges through optical window 12 relatively horizontally and travelling in a forward direction. Other light rays striking curved region 16 will likewise emerge through optical window 12 travelling relatively horizontally and in a forward direction. Thus these light rays are reasonably collimated into a beam in that direction.

A different situation exists with regard to light ray 28 that strikes flat bottom wall 20 of optical cavity 14. After reflection, light ray 28 becomes reflected ray 30. The direction of reflected light ray 30 has a much larger vertical component than the direction of reflected light ray 26. This larger vertical component to the direction of reflected ray 30 creates the safety problem previously described.

Figure 3:
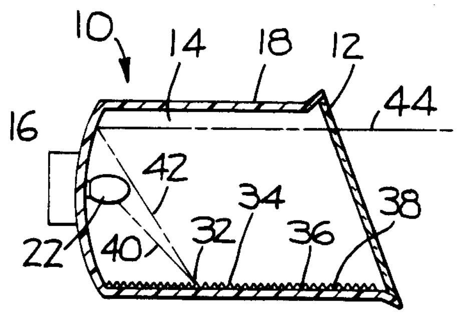
FIG. 3 is a cross-sectional side view of an automotive headlamp according to the invention.

FIG. 3 illustrates the operation of the invention. A structured surface including a series of ridges and grooves, such as ridges 32 and 34 and grooves 36 and 38, overlies flat surface 20 of reflector housing 10. The bases of the grooves and the peaks of the ridges lie in a pair of parallel planes. Alternatively the ridges and grooves could be formed directly on surface 20. The structured surface is rendered highly reflective in a manner similar to that of reflector housing 10. A light ray 40 is emitted by light bulb 22 and strikes ridge 32. After reflection by ridge 32, light ray 40 becomes reflected ray 42 and is directed back toward reflector housing 10. After another reflection by reflector housing 10 reflected beam 42 becomes twice reflected beam 44 and emerges from optical cavity 14 through optical window 12 in a direction similar to the direction of the main horizontally collimated light beam.

It is not critical that the light reflected by ridges such as ridge 32 be reflected directly to curved reflector 16. The light could be reflected to flat reflector 18 and from there to curved reflector 16. Other multiple reflection schemes are also possible. The key point is that the light striking the bottom flat surface of optical cavity 14 undergoes multiple reflections to remove vertical components prior to emerging from optical cavity 14.

If the ridges and grooves are small, for example less than 0.01 inch on a side, and both sides of each ridge are silvered, the headlamp will appear to have a flat reflectorized surface when it is not illuminated. Alternatively the surface of each ridge closer to the bulb could be reflectorized, while the opposing surface more distant from the bulb could be any desired color. In this way the headlamp will work with no loss of efficiency because the light emitted by the bulb will strike the reflectorized surfaces of the ridges, but the lower surface will appear to be of a different color to an observer. That color may, for example, be chosen to match that of the automobile body.

Figure 4:
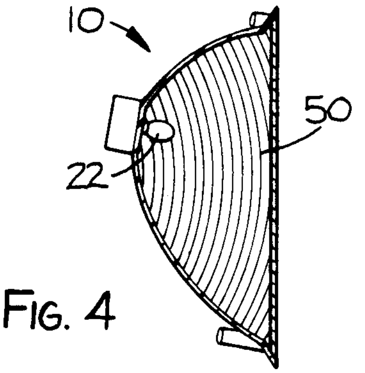
FIG. 4 is a cross-sectional top view of an automotive headlamp according to a preferred embodiment of the invention.

Although the ridges and grooves on flat surface 20 could be straight, improved performance is provided when those ridges and grooves are curved as illustrated in FIG. 4. FIG. 4 is a cross-sectional top view of a preferred embodiment of the headlamp of the invention. The ridges and grooves provided on surface 20 are shown schematically by curved lines 50. Preferably these reflectors will direct the light to a point close to, but not in, bulb 22. The use of curved structures such as ridges and grooves 50 will thus improve performance by reflecting light back toward the center of reflector housing 10.

Figure 5A:
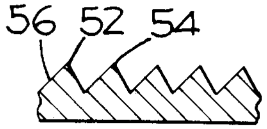
FIGS. 5A and 5B are drawings of surface structures used in a preferred embodiment of the invention.
Figure 5B:

An additional performance enhancement may be obtained by varying the topology of the ridges and grooves as illustrated in FIGS. 5A and 5B. FIG. 5A shows ridges 52 and 54 each of which has a reflective surface that makes a relatively small angle with the horizontal. FIG. 5B, on the other hand, includes ridges 58 and 60 each of which has a reflective surface that makes a relatively large angle with the horizontal. Ridges as illustrated in FIG. 5A may be provided in the region close to light source 22 while ridges as illustrated in FIG. 5B may be provided in the region relatively distance from light source 22. In this way each ridge may be optimized to reflect a maximum amount of light back toward the region of reflective housing 10 immediately surrounding light source 22. For ease of design the shapes of groups of ridges may be optimized for the average distance between members of the group and the bulb. Alternatively maximum headlamp efficiency may be obtained by designing each ridge individually to provide the best performance at its individual distance from the bulb.

What is claimed is:

1. An automotive lighting element comprising a reflector defining an optical cavity having an optical window and a light source in said optical cavity, said reflector comprising:

a smoothly curved portion;

a structured surface portion having a plurality of ridges and grooves such that light emitted by said light source and striking said structured surface will be reflected a first time by said structured surface and a second time by said reflector prior to emerging from said optical cavity, said grooves having bases that are located in a plane.

2. The automotive lighting element of claim 1 wherein a first of said ridges has a surface that makes a first angle with said plane and a second of said ridges has a surface that makes a second angle with said plane, said first ridge being closer to said light source than said second ridge and said second angle being greater than said first angle.

3. The automotive lighting element of claim 1 wherein said ridges and grooves are curved so that said light reflected from said ridges and grooves to said curved portion of said reflector strikes said curved portion near said light source.

4. The automotive lighting element of claim 3 wherein a first of said ridges has a surface that makes a first angle with said plane and a second of said ridges has a surface that makes a second angle with said plane, said first ridge being closer to said light source than said second ridge and said second angle being greater than said first angle.

5. An automotive lighting element comprising a reflector defining an optical cavity having an optical window and a light source in said optical cavity, said reflector comprising:

a smoothly curved portion;

a structured surface portion having a plurality of ridges and grooves such that light emitted by said light source and striking said structured surface will be reflected a first time by said structured surface and a second time by said reflector prior to emerging from said optical cavity, each of said ridges has a first side proximate to said light source and a second side distant from said light source, each of said first sides having a specularly reflective finish and each of said second sides being colored.

6. The automotive lighting element of claim 5 wherein said grooves have bases that are located in a plane.

7. The automotive lighting element of claim 6 wherein a first of said ridges has a surface that makes a first angle with said plane and a second of said ridges has a surface that makes a second angle with said plane, said first ridge being closer to said light source than said second ridge and said second angle being greater than said first angle.

8. The automotive lighting element of claim 5 wherein said ridges and grooves are curved so that said light reflected from said ridges and grooves to said curved portion of said reflector strikes said curved portion near said light source.

9. The automotive lighting elements of claim 8 wherein said grooves have bases that are located in a plane.

10. The automotive lighting element of claim 9 wherein a first of said ridges has a surface that makes a first angle with said plane and a second of said ridges has a surface that makes a second angle with said plane, said first ridge being closer to said light source than said second ridge and said second angle being greater than said first angle.

* * * * *